(12) United States Patent
Takeshita

(10) Patent No.: US 9,523,440 B2
(45) Date of Patent: Dec. 20, 2016

(54) FUEL CELL SYSTEM

(75) Inventor: Masahiro Takeshita, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1236 days.

(21) Appl. No.: 12/513,717

(22) PCT Filed: Nov. 7, 2007

(86) PCT No.: PCT/JP2007/072040
§ 371 (c)(1),
(2), (4) Date: May 6, 2009

(87) PCT Pub. No.: WO2008/069005
PCT Pub. Date: Jun. 12, 2008

(65) Prior Publication Data
US 2010/0119912 A1    May 13, 2010

(30) Foreign Application Priority Data

Dec. 7, 2006  (JP) .................................. 2006-330736

(51) Int. Cl.
| | | |
|---|---|---|
| *H01M 8/04089* | (2016.01) | |
| *H01M 2/00* | (2006.01) | |
| *F16K 31/126* | (2006.01) | |
| *H01M 8/04* | (2016.01) | |

(52) U.S. Cl.
CPC ...... *F16K 31/1262* (2013.01); *H01M 8/04089* (2013.01); *Y02E 60/50* (2013.01)

(58) Field of Classification Search
CPC ....... H01M 8/04089; H01M 8/04; H01M 2/00
See application file for complete search history.

(56) References Cited

U.S. PATENT DOCUMENTS

2006/0107681 A1*  5/2006  Uno et al. .................... 62/323.1

FOREIGN PATENT DOCUMENTS

| JP | 7-310852   | A  | 11/1995 | |
|----|------------|----|---------|---|
| JP | 7310852    | *  | 11/1995 | ............... E03F 3/00 |
| JP | 9-133247   | A  | 5/1997  | |
| JP | 2003-507779| A  | 2/2003  | |
| JP | 2004-162878| A  | 6/2004  | |
| JP | 2004-183710| A  | 7/2004  | |
| JP | 2004-183713| A  | 7/2004  | |
| JP | 2004-185831| A  | 7/2004  | |
| JP | 2004-311222| A  | 11/2004 | |
| JP | 2004-319412| A  | 11/2004 | |

(Continued)

OTHER PUBLICATIONS

Office Action issued Dec. 3, 2010 in Chinese Patent Application No. 200780045061.8 with partial English translation of the Office Action.

*Primary Examiner* — Barbara Gilliam
*Assistant Examiner* — Angela Martin
(74) *Attorney, Agent, or Firm* — Andrews Kurth Kenyon LLP

(57) ABSTRACT

An outlet shutoff valve where pressing surfaces, which press against each other, of a valve member and a valve seat are tilted relative to the vertical direction and where a drive shaft can be driven in a direction tilted relative to the vertical direction. In the outlet shutoff valve, the pressing surfaces are set high on the upstream side of gas flowing in a flow-path-forming pressure chamber, where the gas flows, and low on the downstream side.

4 Claims, 3 Drawing Sheets

(56) References Cited

FOREIGN PATENT DOCUMENTS

| JP | 2005-093104 A |   | 4/2005 |             |          |
|----|---------------|---|--------|-------------|----------|
| JP | 2005-183357 A |   | 7/2005 |             |          |
| JP | 2006-032134 A | * | 2/2006 | ............ | H01M 8/04 |

* cited by examiner

FUEL CELL SYSTEM

This is a 371 national phase application of PCT/JP2007/072040 filed 7 Nov. 2007, claiming priority to Japanese Patent Application No. JP 2006-330736 filed 7 Dec. 2006, the contents of which are incorporated herein by reference.

TECHNICAL FIELD

The present invention relates to a fuel cell system including a fuel cell that generates electricity through an electrochemical reaction between an oxidizing gas and a fuel gas, and a fluid control valve that closes or opens a gas flow path according to a displacement in an axial direction of a valve member having a drive shaft.

TECHNICAL BACKGROUND

A fuel cell system includes a fuel cell that generates electricity through an electrochemical reaction between a fuel gas and an oxidizing gas (reaction gases), a gas-supplying flow path that supplies the reaction gases to the fuel cell, and a gas-discharging flow path that discharges the reaction gases from the fuel cell. Open/close valves for the fuel cell, corresponding to the fluid control valve, can be provided in the gas-supplying flow path and the gas-discharging flow path.

For example, an open/close valve for a fuel cell disclosed in JP 2004-183713 A includes a valve member having a pillar portion, which is movable in its axial direction to close or open the gas flow paths. The open/close valve for a fuel cell includes a diaphragm that divides an internal space into two chambers. The open/close valve is provided at a hydrogen-discharging portion that discharges hydrogen exhausted from the fuel cell. A path branched from an air-supplying path, which supplies air to the fuel cell, is connected to one chamber of the two chambers of the open/close valve. A coil spring is provided in the other chamber of the two chambers. The coil spring resiliently urges the valve member so as to open the other chamber and discharge the discharged hydrogen. If air is supplied to one chamber of the valve in an operating state, fluid pressure acts on the diaphragm to cause the valve member to contact a valve seat against an elastic force of the coil spring while the other chamber is closed.

A fuel cell system disclosed in JP 2004-185831 A includes a pressure control unit provided in a gas-supplying flow path that supplies an anode side fuel gas to a fuel cell stack, and a shutoff valve provided on a gas upstream side of the pressure control unit. The shutoff valve includes a valve member connected to a plunger, which departs from a valve seat to open the valve when its solenoid is excited. The valve member is tilted relative to the up-and-down direction on the drawing surface (refer to FIG. 7 illustrated in JP 2004-185831 A).

A fuel cell system disclosed in JP 2006-32134 A includes a gas discharge tube connected to a vapor-liquid separator that separates gas and fluid from an anode side fuel gas. A discharge valve provided in the gas discharge tube includes a valve seat and a valve member tilted relative to the gravity-acting direction at an angle greater than 0 and less than 90 degrees (e.g., 45 degrees) in a direction opposed to the discharge direction of the anode discharge gas.

A drain apparatus for a fuel cell system disclosed in JP 2004-311222 A includes an open/close valve attached to an inclined surface formed at a lower portion of a water reservoir tank. The open/close valve opens and closes in response to a valve-opening signal or a valve-closing signal.

According to the open/close valve for a fuel cell disclosed in JP 2004-183713 A, the valve member and the valve seat are not tilted relative to the gravity-acting direction. Therefore, during or stopping an operation of the fuel cell, water or liquefied water vapor, if contained in the gas flowing in the flow path, may remain at a peripheral portion of the valve seat where the valve seat contacts the valve member. If the remaining water freezes at or below the freezing point, the open/close valve may fail to open and close smoothly.

For example, in a fuel cell system, gas flowing in a gas flow path may contain water or water vapor for either of the following two reasons. As one reason, if a humidifier is provided in a gas-supplying flow path to increase the power generation efficiency of the fuel cell, water vapor contained in the gas may liquefy on a humidifier downstream side when the humidifier humidifies the gas. As another reason why the gas flowing in the gas flow path may contain water or water vapor, water is a by-product of the power generation by the fuel cell and the water may be contained in the gas discharged from the fuel cell. If the gas contains water or water vapor as described above, water may remain in the periphery of pressing surfaces, which press against each other, of the valve member and the valve seat. If the water freezes, the open/close valve may fail to open and close smoothly.

Meanwhile, according to the discharge valve provided in the fuel cell system disclosed in JP 2006-32134 A, a surface of the valve seat to be pressed against the valve member is tilted relative to the gravity acting direction, i.e., the vertical direction. However, the pressing surface of the valve seat to be pressed against the valve member is positioned low on an upstream side of gas flowing in a flow path and high on the gas downstream side. When the pressing surface of the valve seat is tilted, the flow of gas in operation may cause water to flow upward along the pressing surface. In other words, the flow of gas may prevent the water from falling due to gravity along the down slope of the pressing surface. In short, the effect of gravity that causes the water to fall along the pressing surface may be cancelled by the effect of flowing gas that causes the water to move upward along the pressing surface. Therefore, when the fuel cell system is in operation, the tilted configuration of the valve seat may fail to be effectively used to remove the water from the pressing surface of the valve seat and may not be able to prevent freezing of the remaining water. Thus, the valve may fail to open and close smoothly in a low-temperature environment.

According to the shut off valve of the fuel cell system disclosed in JP 2004-185831 A, although the valve member and the valve seat are tilted relative to the up-and-down direction on the drawing surface, the shutoff valve includes no configuration tilted relative to the gravity-acting direction. Even if the up-and-down direction relative to which the valve member and the valve seat are tilted is the gravity-acting direction, the pressing surface of the valve seat to be pressed against the valve member is set low at the upstream side of the gas flowing in the flow path and high at the gas downstream side. Therefore, the shutoff valve may need to overcome inconvenience similar to that of the discharge valve disclosed in JP 2006-32134 A.

According to the open/close valve attached to the inclined surface formed at the lower portion of the water reservoir tank disclosed in JP 2004-311222 A, the open/close valve is not employed to close or open the gas flow path in which gas flows and is therefore unable to function as a fluid control valve that closes or opens the gas flow path according to a displacement in an axial direction of a valve member having a drive shaft.

An object of the present invention is to make it to effectively perform, in a fuel cell system, smooth opening and closing of a fluid control valve for its operation even in a low-temperature environment.

DISCLOSURE OF THE INVENTION

The present invention provides a fuel cell system including a fuel cell capable of generating electricity through an electrochemical reaction between an oxidizing gas and a fuel gas, and a fluid control valve configured to close or open a gas flow path according to a displacement in an axial direction of a valve member having a drive shaft, wherein the valve member and a valve seat have pressing surfaces, which press against each other and are tilted relative to a gravity-acting direction, and the pressing surfaces of the valve member and the valve seat are set high on an upstream side of gas flowing in the gas flow path and low on a gas downstream side.

Preferably, the fluid control valve is an outlet shutoff valve provided in an oxidizing related gas discharge flow path through which oxidizing related gas is discharged from the fuel cell. Further preferably, an inlet shutoff valve is provided in an oxidizing gas supply flow path that supplies the oxidizing gas to the fuel cell, and the inlet shutoff valve is configured to close or open the gas flow path according to a displacement in an axial direction of a valve member having a drive shaft, wherein the valve member and a valve seat of the inlet shutoff valve have pressing surfaces, which press against each other and are tilted relative to the gravity-acting direction, and the pressing surfaces of the valve member and the valve seat of the inlet shutoff valve are set low on an upstream side of gas flowing in the gas flow path and high on a gas downstream side, and wherein in the inlet shutoff valve and the outlet shutoff valve, a fuel cell side of the flow path is positioned on a front side in the direction along which the drive shaft is driven from a valve-opened state to a valve-closed state.

Furthermore, in the fuel cell system according to the present invention, preferably, the flow of gas in two pipes connected to the fluid control valve at both sides thereof with respect to the gas-flowing direction is in the horizontal direction at least in the periphery of a portion connected to the fluid control valve. Moreover, preferably, an upstream side pipe and a downstream side pipe connected to the fluid control valve have central axes or lower surfaces positioned on a single virtual plane extending in the horizontal direction.

In the fuel cell system according to the present invention, the fluid control valve has the valve member and the valve seat whose pressing surfaces, which press against each other, are tilted relative to the gravity-acting direction. Therefore, even when gas containing water or liquefied water vapor flows in the gas flow path and the water adheres to the pressing surface of the valve member or the valve seat, the water can fall along the pressing surface without remaining on the pressing surface. Furthermore, the pressing surfaces of the valve member and the valve seat are set high on the upstream side of the gas flowing in the gas flow path and low on the gas downstream side. Therefore, when the fuel cell is in operation, the water can smoothly fall due to gravity along the pressing surfaces without being pushed back by the gas flowing in the gas flow path. More specifically, even when the fuel cell is in operation, the water can effectively fall along the pressing surfaces due to the effect of flowing gas and the effect of gravity. Therefore, the fluid control valve can effectively perform smooth opening and closing for its operation even in a low-temperature environment.

Furthermore, the present invention can reduce the size in the vertical direction of the portion including the fluid control valve and the pipes connected to both ends of the fluid control valve. More specifically, when the fluid control valve has a valve member movable in the vertical direction, a pipe having a connecting portion extending in the vertical direction may be used as one of the two pipes connected to the fluid control valve. Therefore, the size in the vertical direction of the portion including the fluid control valve and the pipe tends to be large.

Meanwhile, in the present invention, the driving direction of the drive shaft that constitutes part of the valve member is tilted relative to the vertical direction. Therefore, both of the two pipes can be connected to the fluid control valve in the horizontal direction. The size in the vertical direction of the portion including the fluid control valve and the pipes can be reduced. As a result, the fuel cell system can be easily installed on an automotive vehicle or the like. Furthermore, if the two pipes connected to the fluid control valve are arranged to extend entirely in the horizontal direction, an end of each pipe does not need to be bent perpendicularly or steeply. As a result, the present invention can reduce pressure loss of the gas flowing in the gas flow path.

According to the configuration that the fluid control valve is employed as the outlet shutoff valve provided in the oxidizing related gas discharge flow path through which the oxidizing related gas is discharged from the fuel cell, the effect obtained by employing the configuration of the present invention can be enhanced. More specifically, a large amount of water as a by-product of the power generation by the fuel cell flows in the oxidizing related gas discharge flow path. The water tends to remain in the flow path. Therefore, according to the conventional fuel cell system which includes the outlet shutoff valve provided in the oxidizing related gas discharge flow path and does not include any configuration capable of preventing water from freezing in the peripheral region of the pressing surfaces, which press against each other, of the valve member and the valve seat of the outlet shutoff valve, the valve cannot open and close smoothly. On the other hand, the fuel cell system according to the present invention includes the fluid control valve that can prevent water from remaining on the pressing surfaces and also can, even when the fuel cell is in operation, cause the water to effectively fall along the pressing surfaces due to the effect of flowing gas and the effect of gravity. Therefore, there can be enhanced the effect of the present invention obtained by employing the configuration that "the pressing surfaces, which press against each other, of the valve member and the valve seat are tilted relative to the gravity-acting direction, and the pressing surfaces of the valve member and valve seat are set high on the upstream side of gas flowing in the gas flow path and low on the gas downstream side."

In general, the pipe constituting the oxidizing related gas discharge flow path tends to be thicker than the pipe constituting the flow path through which the fuel related gas flows. More specifically, the oxygen concentration of the oxidizing gas (e.g., air) to be supplied to the fuel cell is low, approximately ⅕, in comparison with the hydrogen concentration of the fuel gas (e.g., hydrogen gas). Furthermore, if the amount of oxygen and the amount of hydrogen that are required for the power generation reaction are taken into consideration, the flow amount of the oxidizing gas to be supplied to the fuel cell becomes larger than the flow amount of the hydrogen gas to be supplied to the fuel cell. This is the reason why the pipe constituting the oxidizing related gas discharge flow path tends to be thicker than the pipe constituting the flow path through which the fuel related gas flows. Therefore, according to the conventional oxidizing related gas discharge flow path, the size in the vertical direction of the portion including the fluid control valve and its pipe tends to be large. On the other hand, the fluid control valve equipped in the fuel cell system according to the present invention can reduce the size in the vertical direction of the portion including the fluid control valve and its pipe. Therefore, the effect of the present invention obtained by employing the configuration that "the pressing surfaces, which press against each other, of the valve member and the valve seat are tilted relative to the gravity-acting direction" can be enhanced.

Moreover, according to the configuration that the inlet shutoff valve is provided in the oxidizing gas supply flow path that supplies the oxidizing gas to the fuel cell, and the inlet shutoff valve is configured to close or open the gas flow path according to a displacement in an axial direction of the valve member having the drive shaft, wherein the valve member and the valve seat of the inlet shutoff valve have pressing surfaces, which press against each other and are tilted relative to the gravity-acting direction, and the pressing surfaces of the valve member and the valve seat of the inlet shutoff valve are set low on the upstream side of gas flowing in the gas flow path and high on the gas downstream side, and wherein in the inlet shutoff valve and the outlet shutoff valve, the fuel cell side of the flow path is positioned on the front side in the direction along which the drive shaft is driven from the valve-opened state to the valve-closed state, the force acting on the valve member in a valve-closing direction can be increased when the valve member is pressed against the valve seat. More specifically, when the fuel cell consumes oxygen and hydrogen to generate electricity, the pressure in the fuel cell side flow path of the fluid control valve becomes negative because of a reduced amount of gas flowing in the flow path. Therefore, the force acting on the valve member in the valve-closing direction can be increased.

By virtue of the configuration that the flow of gas in two pipes connected to the fluid control valve at both sides thereof with respect to the gas flowing direction is in the horizontal direction at least in the periphery of the portion connected to the fluid control valve, the size in the vertical direction of the portion including the fluid control valve and the pipes connected to the fluid control valve can be further decreased.

By virtue of the configuration of the upstream side pipe and the downstream side pipe connected to the fluid control valve and having central axes or lower surfaces positioned on the single virtual plane extending in the horizontal direction, the size in the vertical direction of the portion including the fluid control valve and the pipes connected to the fluid control valve can be further decreased.

DESCRIPTION OF EXEMPLARY EMBODIMENTS

Figure 1:
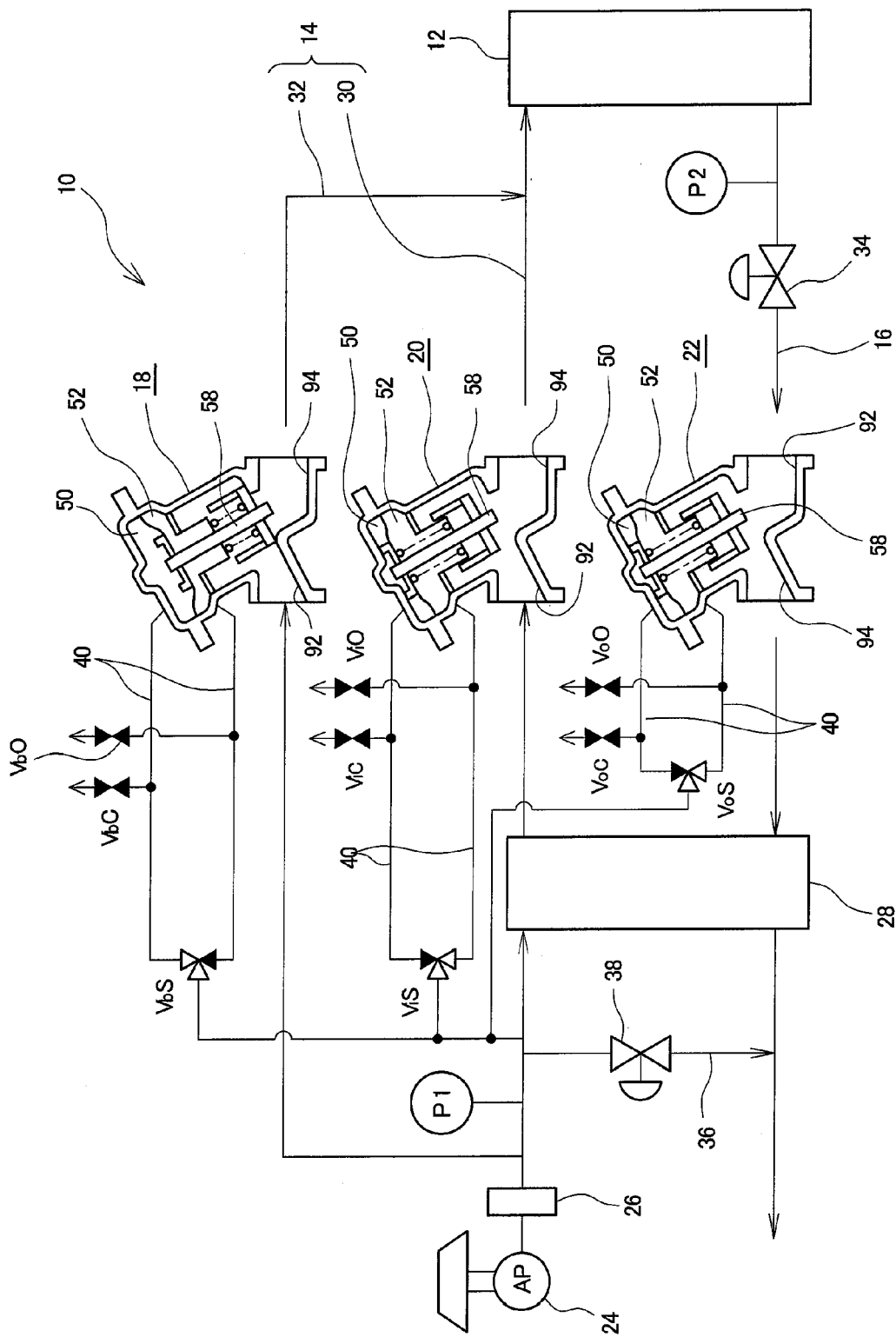
FIG. 1 illustrates a basic configuration of a fuel cell system according to an embodiment of the present invention.
Figure 2:
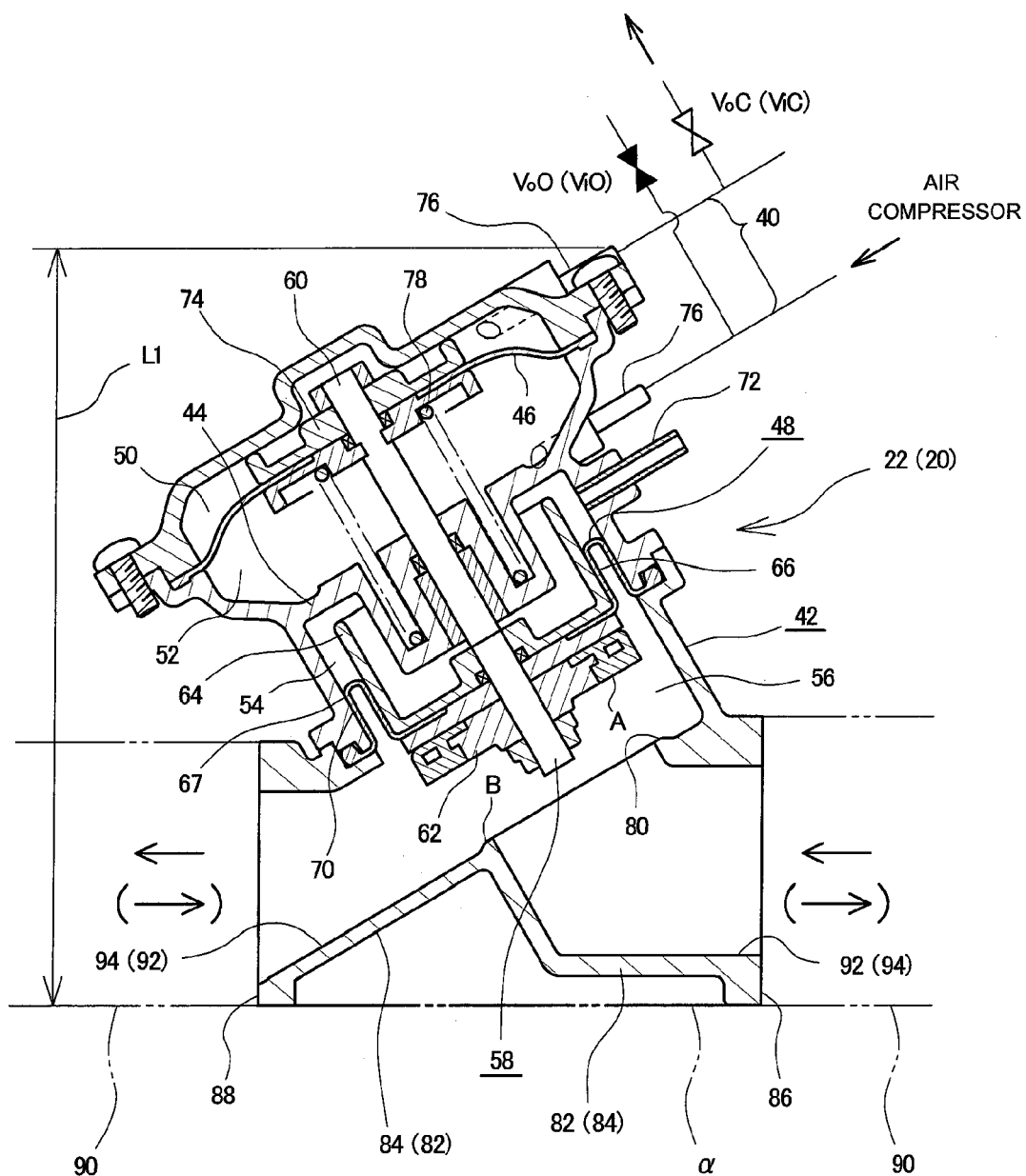
FIG. 2 is a cross-sectional view illustrating a structure of an outlet shutoff valve (or an inlet shutoff valve) usable in the fuel cell system illustrated in FIG. 1, which is in a valve-opened state.

An example according to an embodiment of the present invention is described with reference to the drawings. FIGS. 1 and 2 illustrate the embodiment of the present invention. FIG. 1 illustrates a schematic configuration of a fuel cell system according to the present embodiment. A fuel cell system 10 includes a fuel cell stack 12, an oxidizing gas supply flow path 14 and an oxidizing related gas discharge flow path 16, a humidifier bypass valve 18, an inlet shutoff valve 20, and an outlet shutoff valve 22.

The fuel cell stack 12 generates electricity through an electrochemical reaction between oxygen and hydrogen. More specifically, the hydrogen gas serving as a fuel gas and the air serving as an oxidizing gas are supplied to the fuel cell stack 12. Electrical energy can be obtained by a plurality of fuel cells (not illustrated) in the fuel cell stack 12, through the electrochemical reaction between oxygen and hydrogen. The fuel cell includes, for example, a film-electrode assembly of electrolytic films each being sandwiched between an anode side electrode and a cathode side electrode, and separators disposed at both ends of the film-electrode assembly.

The fuel cell system 10 according to the present embodiment is, for example, installable on and usable for a fuel cell vehicle, according to which the fuel cell stack 12 serves as a power source of a vehicle traction motor. The fuel cell system according to the present embodiment can also be used for any other devices different from the device for the vehicle.

The air serving as an oxidizing gas is supplied via the oxidizing gas supply flow path 14 to the fuel cell stack 12. An air compressor 24 and an intercooler 26 are provided on the gas upstream side of the oxidizing gas supply flow path 14. The air, compressed by the air compressor 24, is cooled by the intercooler 26 and humidified by a humidifier 28. Then, the air is supplied to a flow path on the cathode side electrode side of the fuel cell stack 12.

In addition to a main path 30 that supplies air to the fuel cell stack 12 via the humidifier 28, a humidifier bypass path 32 is provided in parallel with the main path 30 with respect to the flow direction of gas. The air passing through the humidifier bypass path 32 is supplied to the fuel cell stack 12 without passing through the humidifier 28. The humidifier bypass valve 18 is provided at an appropriate position of the humidifier bypass path 32.

An air off-gas; i.e., the air having been supplied to the fuel cell stack 12 and used for the electrochemical reaction in each fuel cell, is discharged from the fuel cell stack 12 via the oxidizing related gas discharge flow path 16. The air off-gas, which is discharged via the oxidizing related gas discharge flow path 16, is sent to the humidifier 28 via a pressure-regulating valve 34. Then, the air off-gas is discharged to the atmosphere via a diluter (not illustrated). The pressure-regulating valve 34 is controlled to adjust the pressure (back-pressure) of the air discharged from the fuel cell stack 12 to be an appropriate pressure value according to an operational state of the fuel cell stack 12. More specifically, the air pressure in the oxidizing related gas discharge flow path 16, which corresponds to the position of a pressure sensor P2, can be adjusted according to a valve opening degree of the pressure-regulating valve 34. The humidifier 28 has a function of humidifying fresh air to be supplied to the fuel cell stack 12 by removing water from the air discharged from the fuel cell stack 12 and adding the removed water to the fresh air.

The fuel cell stack 12 is connected to a hydrogen gas supply flow path that supplies the hydrogen gas and to a hydrogen related gas discharge flow path that discharges a hydrogen related gas, although these flow paths are not illustrated in FIG. 1.

A fuel cell bypass path 36 is connected between the upstream side connecting point of the humidifier bypass path 32 and the humidifier 28 along the main path 30 of the oxidizing gas supply flow path 14, and on the gas downstream side of the humidifier 28 along the oxidizing related gas discharge flow path 16. The fuel cell bypass path 36 is parallel to the fuel cell stack 12 with respect to the flow of gas. A fuel cell bypass valve 38 is provided in the fuel cell bypass path 36. The fuel cell bypass valve 38 can be used to control the pressure of air supplied to the fuel cell stack 12. More specifically, the pressure of air in the oxidizing gas supply flow path 14, corresponding to an inlet pressure sensor P1 position, can be adjusted by the valve opening degree of the fuel cell bypass valve 38. The air pressure corresponding to the inlet pressure sensor P1 position can be also adjusted by the flow amount of air discharged from the air compressor 24. Needless to say, both the valve opening degree of the fuel cell bypass valve 38 and the flow amount of the air discharged from the air compressor 24 can be used to adjust the air pressure corresponding to the inlet pressure sensor P1 position.

It is desired to quickly increase the temperature of the fuel cell stack 12 startup in cold conditions, such as when the air temperature is below freezing (below the freezing point of water). To this end, in comparison with an amount of hydrogen gas supplied to the fuel cell stack 12, the amount of air supplied to the fuel cell stack 12 can be reduced to be smaller than the amount normally used in a reaction with the hydrogen gas for generation of electricity. More specifically, the cathode stoichiometric ratio can be reduced to generate electricity at a lower efficiency and quickly increase the temperature of the fuel cell stack 12. However, the hydrogen concentration in the oxidizing related gas discharge flow path 16 may become higher due to the hydrogen gas transferring from an anode side flow path to a cathode side flow path via the electrolytic film in the fuel cell stack 12. In this case, as an example usage of the fuel cell bypass valve 38, the fuel cell bypass valve 38 can be kept in a valve-opened state to reduce the hydrogen concentration in the oxidizing related gas discharge flow path 16 by means of the air bypassing the fuel cell stack 12. Similarly, the concentration of hydrogen contained in the hydrogen off-gas (i.e., hydrogen related gas discharged from the fuel cell stack 12) may become higher than an ordinary value. In this case, the fuel cell bypass valve 38 can be kept in the valve-opened state to increase the amount of air flowing into the diluter without passing through the fuel cell stack 12. As a result, the hydrogen concentration in the discharged gas can be reduced.

The inlet shutoff valve 20 is provided on the gas downstream side of the humidifier 28 in the main path 30 of the oxidizing gas supply flow path 14. The outlet shutoff valve 22 is provided on the gas upstream side of the humidifier 28 in the oxidizing related gas discharge flow path 16. In the present embodiment, the outlet shutoff valve 22 functions as a fluid control valve described in the claims and corresponds to an open/close valve for a fuel cell.

More specifically, the outlet shutoff valve 22 can function as a fluid control valve capable of adjusting the flow of air in the oxidizing related gas discharge flow path 16. Three PSVs (Pressure Switching Valves), which are electromagnetic valves, are connected to each of the humidifier bypass valve 18, the inlet shutoff valve 20, and the outlet shutoff valve 22 via a pressure-controlling flow path 40.

More specifically, three PSVs VbS, VbC, and VbO are connected to the humidifier bypass valve 18. Three PSVs ViS, ViC, and ViO are connected to the inlet shutoff valve 20. Three PSVs VoS, VoC, and VoO are connected to the outlet shutoff valve 22. These PSVs are connected to the gas upstream side of the main path 30 of the oxidizing gas supply flow path 14 via the pressure-controlling flow path 40; for example, at a position between the air compressor 24 and the humidifier 28. These PSVs can be controlled by a control unit (not illustrated), such as an ECU (Electronic Control Unit).

The drive of the humidifier bypass valve 18, the inlet shutoff valve 20, and the outlet shutoff valve 22 are controlled by the corresponding PSVs according to the state of the fuel cell stack 12, etc.

Next, with reference to FIG. 2, the configuration and functions of the inlet shutoff valve 20 and the outlet shutoff valve 22 will be described by mainly referring to the outlet shutoff valve 22 as a representative case. The inlet shutoff valve 20 and the outlet shutoff valve 22 are similar in configuration. A configuration of the humidifier bypass valve 18 is described later.

As illustrated in FIG. 2, the outlet shutoff valve 22 is a normally-open type shutoff valve that opens as a valve-opened state in a normal state where all of internal pressure chambers are kept at the same pressure.

The outlet shutoff valve 22 includes upper and lower spaces separated by a partition 44 in a housing 42 constituted by a plurality of housing elements assembled together. A main diaphragm 46 is provided in one of the separated spaces and a sub diaphragm 48 is provided in the other space. A valve-closing pressure chamber 50 is provided on an upper surface side of the main diaphragm 46. A valve-opening pressure chamber 52 is provided on a lower surface side of the main diaphragm 46. An atmospheric pressure chamber 54 is provided on an upper surface side of the sub diaphragm 48. A flow-path-forming pressure chamber 56 is provided on a lower surface side of the sub diaphragm 48. The valve-closing pressure chamber 50, the valve-opening pressure chamber 52, the atmospheric pressure chamber 54, and the flow-path-forming pressure chamber 56 are mutually separated. No two of these pressure chambers 50, 52, 54, and 56 can communicate with each other inside the valve 22.

The main diaphragm 46 and the sub diaphragm 48 are connected to a valve member 58. More specifically, the valve member 58 including a drive shaft 60 is present in the housing 42. The valve member 58 is supported by the housing 42, so as to be displaceable in the axial direction of the drive shaft 60. The valve member 58 includes the drive shaft 60 and a disk-shaped valve member body 62 fixed to a lower edge portion of the drive shaft 60. The drive shaft 60 is tilted relative to the vertical direction (up-and-down direction in FIG. 2), which is the gravity-acting direction. The drive shaft 60 can move in a direction tilted relative to the vertical direction. Correspondingly, a portion of the housing 42 that surrounds the outer periphery and the upper end of the drive shaft 60 is tilted relative to the vertical direction. A cylindrical member 64 having a bottom portion is connected to an intermediate lower-side portion of the drive shaft 60.

An inner circumference end portion of the sub diaphragm 48, which is made of an elastic member (e.g., an elastomer or the like such as a rubber) is sandwiched between a lower surface of a bottom plate portion of the cylindrical member 64 and an upper surface of the valve member body 62. Thus, an inner circumferential portion of the sub diaphragm 48 is fixed to the drive shaft 60. An outer circumference end portion of the sub diaphragm 48 is connected to an inner circumference portion of the housing 42; more specifically, is sandwiched between two housing elements constituting the housing 42. Thus, a lower-side space in the housing 42, which is positioned below the partition 44, is separated by the sub diaphragm 48 into the atmospheric pressure chamber 54 (an upper-side portion) and the flow-path-forming pressure chamber 56 (a lower-side portion). The atmospheric pressure chamber 54 and the flow-path-forming pressure chamber 56 are hermetically isolated.

The sub diaphragm 48 has a diaphragm side cylindrical portion 66 at an intermediate portion in the radial direction. The diaphragm side cylindrical portion 66 is elastically deformed along and pressed against an outer cylindrical surface of the cylindrical member 64. The sub diaphragm 48 has an annular deformable portion 67, which is present between the outer cylindrical surface of the cylindrical member 64 and an inner surface of the housing 42. The annular deformable portion 67 is deformed upward so as to form an annular chevron shape, a lower surface of which can receive the pressure of the flow-path-forming pressure chamber 56. As illustrated in FIG. 2, when the lower surface of the annular deformable portion 67 receives the pressure of the flow-path-forming pressure chamber 56, the sub diaphragm 48 elastically deforms to move the drive shaft 60.

The sub diaphragm 48 has a second diaphragm side cylindrical portion 70 at an outer intermediate portion in the radial direction. The second diaphragm side cylindrical portion 70 is elastically deformed along and pressed against a cylindrical surface portion of the inner surface of the housing 42. When the drive shaft 60 moves downward from the valve-opened state illustrated in FIG. 2, the second diaphragm side cylindrical portion 70 elastically deforms while its upper portion is pulled off the cylindrical surface portion of the housing 42.

The flow-path-forming pressure chamber 56 constitutes part of the oxidizing related gas discharge flow path 16 (FIG. 1) (the oxidizing gas supply flow path 14 in the case of the inlet shutoff valve 20). An upstream side and a downstream side of the flow-path-forming pressure chamber 56 are disconnected or connected by the valve member 58. The atmospheric pressure chamber 54 is connected to an atmosphere communicating tube 72 that has one end communicating with the atmosphere. Thus, the atmospheric pressure chamber 54 is opened to the atmosphere.

A suppressing member 74 is connected to an upper end portion of the valve member 58. The suppressing member 74 includes two disk-shaped elements united together. An inner circumference end portion of the main diaphragm 46, made of an elastic member (e.g., an elastomer or the like such as a rubber), is sandwiched between two disk-shaped elements constituting the suppressing member 74. Therefore, the main diaphragm 46 is fixed to an outer circumferential portion of the suppressing member 74. An outer circumference end portion of the main diaphragm 46 is sandwiched between two housing elements constituting the housing 42. Thus, the outer circumference end portion of the main diaphragm 46 is fixed to the inner circumference portion of the housing 42. Accordingly, an upper-side space of the housing 42, which is positioned above the partition 44, is separated into the valve-closing pressure chamber 50 (an upper-side portion) and the valve-opening pressure chamber 52 (a lower-side portion) by the main diaphragm 46. The valve-closing pressure chamber 50 and the valve-opening pressure chamber 52 are hermetically isolated. A supply/discharge tube 76 is connected to each of the valve-closing pressure chamber 50 and the valve-opening pressure chamber 52.

A coil spring 78, which serves as elastic force applying means, is provided between a lower surface of the suppressing member 74 and the partition 44. The coil spring 78 generates elastic force acting to the valve member 58 in an obliquely upward direction; more specifically, so that the valve is brought into an opening state. When the valve member 58 moves in an obliquely downward direction, a lower surface of the valve member body 62 is brought into contact with a valve seat 80 and closes the flow path. More specifically, the flow path can be disconnected or connected according to a displacement of the drive shaft 60 along its axial direction. The diameter of a pressure-receiving area of an upper-side portion (including the main diaphragm 46) of the drive shaft 60 is sufficiently larger than the diameter of a pressure-receiving area of a lower-side portion (including the sub diaphragm 48) of the drive shaft 60.

In the housing 42, an inlet side connecting portion 82 and an outlet side connecting portion 84 are provided at a gas upstream side and a gas downstream side of the flow-path-forming pressure chamber 56. The inlet side connecting portion 82 includes the valve member 58 side tilted relative to the vertical direction and a connection edge portion (right edge portion in FIG. 2) that includes a connecting surface 86 facing to the horizontal direction. The outlet side connecting portion 84 tilts relative to the vertical direction in a manner opposed to the direction of the valve member 58 side of the inlet side connecting portion 82. The outlet side connecting portion 84 has a connection edge portion (left edge portion in FIG. 2), which includes a connecting surface 88 facing in the horizontal direction. In the case of the inlet shutoff valve 20, the inlet side connecting portion 82 and the outlet side connecting portion 84 are oppositely disposed in relation to those of the outlet shutoff valve 22.

The flow of gas in two pipes 90 connected to the outlet shutoff valve 22 or the inlet shutoff valve 20 at both sides thereof with respect to the gas flowing direction is in the horizontal direction at least in the periphery of a portion connected to the outlet shutoff valve 22 or the inlet shutoff valve 20. The lower surfaces of the two pipes 90 connected to the gas upstream side and the gas downstream side of the outlet shutoff valve 22, or the inlet shutoff valve 20, are positioned on a single virtual plane a extending in the horizontal direction.

The outlet shutoff valve 22 includes mutually pressing surfaces A and B of the valve member body 62 and the valve seat 80, which are tilted relative to the vertical direction; more specifically, relative to the gravity-acting direction. The pressing surfaces A and B are positioned higher on the upstream side (right side of FIG. 2) of the gas flowing in the gas flow path; i.e., in the flow-path-forming pressure chamber 56, and positioned lower on the gas downstream side (left side of FIG. 2). Similarly, the inlet shutoff valve 20 includes the mutually pressing surfaces A and B of the valve member body 62 and the valve seat 80, which are tilted relative to the vertical direction. However, the pressing surfaces A and B are positioned lower on the upstream side (left side of FIG. 2) of the gas flowing in the flow-path-forming pressure chamber 56 and higher on the gas downstream side (right side of FIG. 2).

According to the outlet shutoff valve 22, the valve-closing pressure chamber 50 is connected to the pressure-controlling flow path 40 on the PSV VoC side via the supply/discharge tube 76 (FIG. 2). The valve-opening pressure chamber 52 is connected to the pressure-controlling flow path 40 on the PSV VoO side via the supply/discharge tube 76. When the drive shaft 60 moves along its axial direction, a central portion of the main diaphragm 46 moves obliquely relative to the vertical direction while the main diaphragm 46 deforms its shape. Needless to say, the main diaphragm 46 can be configured to move entirely in the obliquely up-and-down direction.

In the outlet shutoff valve 22, if the valve member 58 moves upward due to a displacement of the drive shaft 60 as illustrated in FIG. 2, the valve opens to let air off-gas (oxidizing related gas) flow from its inlet 92 to its outlet 94. Therefore, the air off-gas can be discharged via the oxidizing related gas discharge flow path 16 from the upstream side thereof to the humidifier 28 side thereof. If the valve member 58 moves downward due to a displacement of the drive shaft 60, the valve closes and stops the flow of air off-gas in the oxidizing related gas discharge flow path 16 directed from the upstream side to the humidifier 28.

In the case of the inlet shutoff valve 20, the inlet 92 and the outlet 94 are oppositely disposed in relation to those of the outlet shutoff valve 22. If the valve member 58 moves upward due to a displacement of the drive shaft 60, the valve opens to discharge the air via the oxidizing gas supply flow path 14 from its upstream side to the fuel cell stack 12. If the valve member 58 moves downward due to a displacement of the drive shaft 60, the valve closes and stops the flow of air in the oxidizing gas supply flow path 14 directed from its upstream side to the fuel cell stack 12.

The displacement of the drive shaft 60 in its axial direction can be controlled by three PSVs. More specifically, three PSVs VoS, VoC, and VoO control the pressures in the valve-opening pressure chamber 52 and the valve-closing pressure chamber 50 of the outlet shutoff valve 22. Similarly, three PSVs ViS, ViC, and ViO control the valve-opening pressure chamber 52 and the valve-closing pressure chamber 50 of the inlet shutoff valve 20.

The VoS (or ViS) illustrated in FIG. 1 is a 3-WAY; i.e., three-way valve type, PSV capable of selectively connecting one of the valve-closing pressure chamber 50 and the valve-opening pressure chamber 52 to a gas upstream side of the air compressor 24 and disconnecting the other pressure chamber from the gas upstream side of the air compressor 24. Each of VoC, VoO, ViC, and ViO is a 2-Way PSV, which functions as an exhaust valve; i.e., a pressure relief valve. The VoS (or ViS) can change the connection state of the flow path according to an energized state. If the VoS (or ViS) is not energized (i.e., is in a non-energized state), the VoS (or ViS) connects the gas discharge side of the air compressor chamber 24 to the valve-opening pressure chamber 52. If the VoS (or ViS) is energized (i.e., is in an energized state), the VoS (or ViS) connects the gas discharge side of the air compressor 24 to the valve-closing pressure chamber 50. Each of the ViC, ViO, VoC, and VoO closes the valve in the non-energized state and opens the valve in the energized state.

In FIGS. 1 and 2 illustrating a plurality of triangles representing VoS (ViS), VoC (ViC), and VoO (ViO), each black triangle indicates a state where the flow path is closed and each white triangle indicates a state where the flow path is opened.

When the outlet shutoff valve 22 (or the inlet shutoff valve 20) in a valve-closed state is opened as illustrated in FIG. 2, the VoS (or ViS) (FIG. 1) is kept in the non-energized state and the VoC (ViC) is brought into the valve-opened state to let the valve-closing pressure chamber 50 communicate with the atmosphere. Then, pressurized air supplied by the air compressor 24 is introduced into the valve-opening pressure chamber 52 via the valve-opening pressure chamber 52 side supply/discharge tube 76 (FIG. 2) and the pressure-controlling flow path 40. Thus, a pressure difference appears between the pressure in the valve-opening pressure chamber 52 and the pressure (atmospheric pressure) in the valve-closing pressure chamber 50.

The pressurized air is also introduced to the flow-path-forming pressure chamber 56 from the air compressor 24 via an upstream side portion of the oxidizing gas supply flow path 14. Therefore, a pressure difference appears between the pressure in the flow-path-forming pressure chamber 56 and the pressure in the atmospheric pressure chamber 54 opened to the atmosphere. The pressure of the flow-path-forming pressure chamber 56 is applied to the lower surface of the annular deformable portion 67 of the sub diaphragm 48. Therefore, the sub diaphragm 48 pushes the cylindrical member 64 upward. The drive shaft 60 moves upward as illustrated in FIG. 2. The annular deformable portion 67 is kept in a greatly deformed state. As a result, the drive shaft 60 is subjected to a first force F1 that acts upward and corresponds to the pressure difference between the flow-path-forming pressure chamber 56 and the atmospheric pressure chamber 54, a second force F2 that acts upward and corresponds to the pressure difference between the valve-closing pressure chamber 50 and the valve-opening pressure chamber 52, and the elastic force of the coil spring 78. The drive shaft 60 moves upward. In the state where the outlet shutoff valve 22 is in the fully opened state illustrated in FIG. 2, the VoC(ViC) is kept in the valve-closed state to disconnect the valve-closing pressure chamber 50 from the atmosphere. In this state, an upper surface of the suppressing member 74 serves as a stopper that abuts the upper portion of the inner surface of the housing 42.

To close the outlet shutoff valve 22 in the valve-opened state illustrated in FIG. 2, the Vos (or ViS) is energized to introduce the pressurized air supplied by the air compressor 24 to the valve-closing pressure chamber 50 via the supply/discharge tube 76 and the pressure-controlling flow path 40. Additionally, the VoO (ViO) is kept in the valve-opened state to let the valve-opening pressure chamber 52 communicate with the atmosphere. As a result, the drive shaft 60 is subjected to a third force F3 that acts downward and corresponds to the pressure difference between the pressure in the valve-closing pressure chamber 50 and the pressure (atmospheric pressure) in the valve-opening pressure chamber 52. Meanwhile, as indicated in FIG. 2, the pressurized air is introduced from the air compressor 24 to the flow-path-forming pressure chamber 56. The drive shaft 60 is subjected to a fourth force F4 that acts upward (the direction opposed to the third force F3) and corresponds to the pressure difference between the pressure in the flow-path-forming pressure chamber 56 and the pressure in the atmospheric pressure chamber 54 connected to the atmosphere. However, in the present embodiment, the diameter of a pressure-receiving area of a drive shaft 60 upper-side portion including the main diaphragm 46 is set to be sufficiently larger than the diameter of a pressure-receiving area of a drive shaft 60 lower-side portion including the sub diaphragm 48. Therefore, the drive shaft 60 moves downward against the fourth force F4 and the elastic force of the coil spring 78. The valve member body 62 can contact the valve seat 80.

In a state where the outlet shutoff valve 22 is fully closed, if the VoS (or ViS) is brought into the non-energized state, the valve-closing pressure chamber 50 is disconnected from the air compressor 24. As a result, the pressure of the air in the valve-closing pressure chamber 50 is maintained at a constant value. Then, in this state, if the VoO (ViO) is brought into a valve-closed state, the valve-opening pressure chamber 52 is disconnected from the atmosphere. The inlet shutoff valve 20 performs similar open/close operations.

The humidifier bypass valve 18 (FIG. 1) is a normally-closed type shutoff valve that is kept in a valve-closed state where the valve member 58 is closed in a normal state where its pressure chambers are all kept at the same pressure. Although not illustrated in the drawings, a detailed structure of the humidifier bypass valve 18 is similar to that of the inlet shutoff valve 20 or the outlet shutoff valve 22 illustrated in FIG. 2 and includes the coil spring 78 (refer to FIG. 2) provided between an upper surface of the bottom plate portion of the cylindrical member 64 and a lower surface of the partition 44. Alternatively, the humidifier bypass valve 18 can be configured as a normally-closed type shutoff valve that includes a coil spring provided between an upper surface of a member fixed to the upper end portion of the valve member 58 (e.g., the suppressing member 74 (refer to FIG. 2)) and a lower surface of the housing 42.

Similar to the inlet shutoff valve 20, the humidifier bypass valve 18 includes mutually pressing surfaces A and B (refer to FIG. 2) of the valve member body 62 and the valve seat 80, which are tilted relative to the vertical direction. The pressing surfaces A and B are positioned lower on the upstream side (left side of FIG. 2) of the gas flowing in the flow-path-forming pressure chamber 56 (refer to FIG. 2) and higher on the gas downstream side (right side of FIG. 2).

The humidifier bypass valve 18, as illustrated in FIG. 1, includes the valve-closing pressure chamber 50 connected to a VbC side pressure-controlling flow path 40 of the PSV and the valve-opening pressure chamber 52 connected to a VbO side pressure-controlling flow path 40 of the PSV. If the valve member 58 moves upward according to a displacement of the drive shaft 60, the valve opens and discharges the air from the upstream side of the humidifier bypass path 32 to the fuel cell stack 12. If the valve member 58 moves downward according to a displacement of the drive shaft 60, the valve closes and stops the flow of the air directed from the upstream side of the humidifier bypass path 32 to the fuel cell stack 12.

Similar to the inlet shutoff valve 20 and the outlet shutoff valve 22, the displacement of the drive shaft 60 along its axial direction is controlled by three PSVs VbS, VbC, and VbO. In FIG. 1 illustrating a plurality of triangles representing VbS, VbC, and VbO, each black triangle indicates a state where the flow path is closed and each white triangle indicates a state where the flow path is opened. The VbS in the non-energized state connects the gas discharge side of the air compressor 24 to the valve-closing pressure chamber 50. The VbS in the energized state connects the gas discharge side of the air compressor 24 to the valve-opening pressure chamber 52.

When the humidifier bypass valve 18 is opened, the pressurized air supplied by the air compressor 24 is introduced into the valve-opening pressure chamber 52, and the valve-closing pressure chamber 50 is opened to the atmosphere. As a result, the drive shaft 60 (refer to FIG. 2) is subjected to a first force F1' that acts upward and corresponds to the pressure difference between the flow-path-forming pressure chamber 56 into which the pressurized air is introduced from the air compressor 24 and the atmospheric pressure chamber 54 (refer to FIG. 2), and a second force F2' that acts upward and corresponds to the pressure difference between the valve-closing pressure chamber 50 and the valve-opening pressure chamber 52. Therefore, the drive shaft 60 moves upward against the elastic force of the coil spring. In addition, the humidifier bypass valve 18 is opened.

On the other hand, when the humidifier bypass valve 18 is closed, the pressurized air is supplied from the air compressor 24 to the valve-closing pressure chamber 50, and the valve-opening pressure chamber 52 is opened to the atmosphere. Then, the drive shaft 60 is subjected to a force that acts downward and corresponds to the pressure difference between the valve-opening pressure chamber 52 and the valve-closing pressure chamber 50 and the elastic force of the coil spring. Therefore, the drive shaft 60 moves downward. In this case, the drive shaft 60 is also subjected to another force that acts upward and corresponds to the pressure difference between the flow-path-forming pressure chamber 56 and the atmospheric pressure chamber 54. However, the diameter of the pressure-receiving area of the drive shaft 60 upper-side portion including the main diaphragm 46 (refer to FIG. 2) is set to be sufficiently larger than the diameter of the pressure-receiving area of the drive shaft 60 lower-side portion including the sub diaphragm 48 (refer to FIG. 2). Therefore, the drive shaft 60 moves downward. Then, the humidifier bypass valve 18 is closed.

According to the above-described fuel cell system 10, when the fuel cell system 10 is in a non-operative condition, all of the inlet shutoff valve 20, the outlet shutoff valve 22, and the humidifier bypass valve 18 can be maintained in the valve-closed state; namely, in the condition where all of the three PSVs corresponding to each of the inlet shutoff valve 20, the outlet shutoff valve 22, and the humidifier bypass valve 18 are kept in the non-energized state. Therefore, the above-described fuel cell system 10 can prevent supply of fresh air to an internal flow path on the cathode electrode side of the fuel cell stack 12. The above-described fuel cell system 10 can further suppress oxidation of a carbon material that holds a catalyst constituting the film-electrode assembly, which would shorten the life span of the fuel cell stack 12.

In particular, in the present embodiment, as illustrated in FIG. 2, the pressing surfaces A and B, which press against each other, of the valve member body 62 and the valve seat 80 of the outlet shutoff valve 22 are tilted relative to the vertical direction. Therefore, even when water or liquefied water vapor involved in the air off-gas flowing in the flow-path-forming pressure chamber 56 adheres to the pressing surface B of the valve seat 80, the water can fall along the pressing surface B without remaining on the pressing surface B. Furthermore, the pressing surface B of the valve seat 80 is set high on the upstream side (right side in FIG. 2) with respect to the flow direction of gas, in the flow-path-forming pressure chamber 56 and low on the downstream side (left side in FIG. 2). Therefore, when the fuel cell is in operation, the water can smoothly fall due to gravity along the pressing surface B without being pushed back by the gas flowing in the gas flow path. More specifically, even when the fuel cell is in operation, the water can effectively fall along the pressing surface B due to the effect of flowing gas and the effect of gravity. Therefore, the outlet shutoff valve 22 can effectively perform smooth opening and closing for its operation even in a low-temperature environment.

Figure 3:
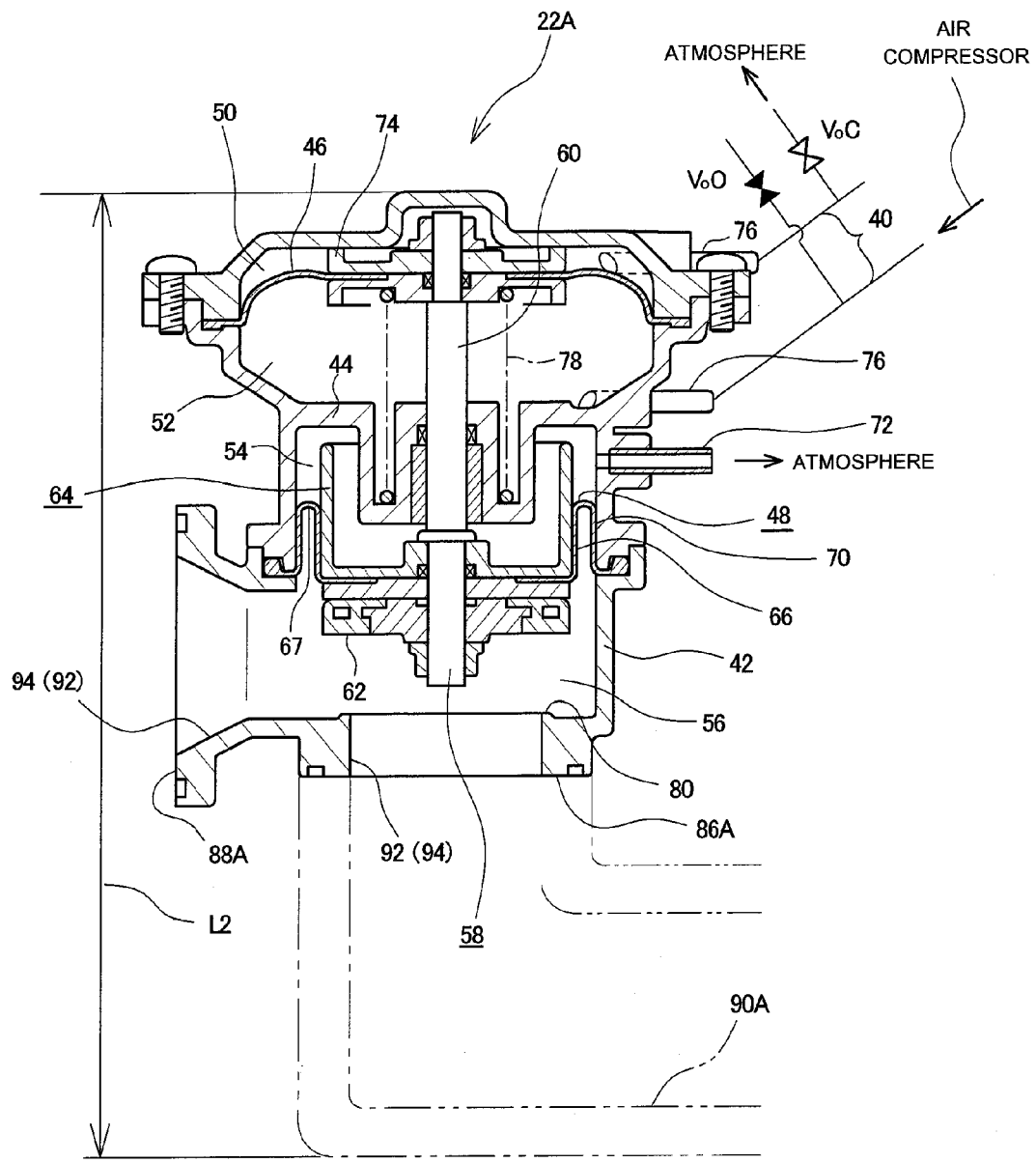
FIG. 3 is a cross-sectional view similar to that of FIG. 2, illustrating an example of an outlet shutoff valve according to another invention, which includes a drive shaft movable in the vertical direction.

Moreover, the present embodiment can reduce the size L1 in the up-and-down direction L1 (FIG. 2) of the portion including each valve (the outlet shutoff valve 22, the inlet shutoff valve 20, and the humidifier bypass valve 18) and the pipes 90 connected to both sides of the valve. More specifically, as compared with the above-described embodiment, an outlet shutoff valve 22A according to another invention includes the valve member 58 movable in the vertical direction (up-and-down direction in FIG. 3) as illustrated in FIG. 3. Similar to the outlet shutoff valve 22 in the above-described embodiment, the outlet shutoff valve 22A includes the left-hand outlet 94 (or the inlet 92) having a connecting surface 88A to be connected to a pipe (not illustrated) and facing the horizontal direction as illustrated in FIG. 3.

According to the outlet shutoff valve 22A including the valve member 58 movable in the vertical direction, a connecting surface 86A of the inlet 92 (or outlet 94) to be connected to a pipe 90A faces the vertical direction (downward direction) as illustrated in FIG. 3. Therefore, the size L2 in the vertical direction (FIG. 3) of the portion including the outlet shutoff valve 22A and the pipe 90A tends to be long. When similar to their counterparts illustrated in FIG. 2, portions of the outlet shutoff valve 22A illustrated in FIG. 3 are denoted by the numerals used for the comparable portions of the outlet shutoff valve 22 illustrated in FIG. 2.

Meanwhile, in the present embodiment, as illustrated in FIG. 2, the outlet shutoff valve 22 (the inlet shutoff valve 20 or the humidifier bypass valve 18) includes the drive shaft 60 constituting the valve member 58 movable in the direction tilted relative to the vertical direction. Therefore, both of the two pipes 90 can be connected to the outlet shutoff valve 22 in the horizontal direction. Therefore, the present embodiment can reduce the size L1 in the vertical direction of the portion including the outlet shutoff valve 22 and its pipes 90. As a result, the fuel cell system 10 can be easily installed on an automotive vehicle. Furthermore, if the two pipes 90 connected to the outlet shutoff valve 22 are arranged to extend entirely in the horizontal direction, an end of each pipe 90 does not need to be bent perpendicularly or steeply on the outlet shutoff valve 22 side. As a result, the present embodiment can reduce pressure loss of the gas flowing in the oxidizing related gas discharge flow path 16 (FIG. 1).

Furthermore, as described in the present embodiment, when the present invention is applied to the outlet shutoff valve 22 provided in the oxidizing related gas discharge flow path 16, the effect of the present invention obtained by employing the configuration of the present invention can be enhanced. More specifically, a large amount of water as a by-product of the power generation by the fuel cell flows in the oxidizing related gas discharge flow path 16. The water tends to remain in the oxidizing related gas discharge flow path 16. Therefore, according to the conventional fuel cell system that includes the outlet shutoff valve provided in the oxidizing related gas discharge flow path and does not include any configuration capable of preventing water from freezing in the peripheral region of the pressing surfaces, which press against each other, of the valve member and the valve seat of the outlet shutoff valve, the valve cannot open and close smoothly.

On the other hand, the outlet shutoff valve 22 according to the present embodiment can prevent water from remaining on the pressing surface B of the valve seat 80 and also can, even when the fuel cell is in operation, cause the water to effectively fall along the pressing surface B due to the effect of flowing gas and the effect of gravity. Therefore, the effect of the present invention obtained by employing the configuration that "the pressing surfaces A and B, which press against each other, of the valve member 58 and the valve seat 80 are tilted relative to the vertical direction, and the pressing surfaces A and B of the valve member 58 and valve seat 80 are set high on the upstream side of gas flowing in the flow-path-forming pressure chamber 56 and low on the gas downstream side" can be enhanced.

The pipe 90 arranging the oxidizing related gas discharge flow path 16 tends to be thicker than the pipe arranging the flow path that supplies the fuel related gas, as described in the section Effects of the Present Invention. Therefore, according to the conventional fuel cell system that includes the oxidizing related gas discharge flow path 16 equipped with the outlet shutoff valve, the size in the vertical direction of the portion including the outlet shutoff valve and its pipe tends to be large. On the other hand, the outlet shutoff valve 22 (FIG. 2) according to the present embodiment can reduce the size L1 in the vertical direction of the portion including the outlet shutoff valve 22 and the pipe 90 connected to the valve 22. Therefore, the effect of the present invention obtained by employing the configuration that "the pressing surfaces A and B, which press against each other, of the valve member 58 and the valve seat 80 are tilted relative to the vertical direction" can be enhanced.

Furthermore, in the present embodiment, the configuration of the inlet shutoff valve 20 is similar to the configuration of the outlet shutoff valve 22. The pressing surfaces A and B, which press against each other, of the valve member 58 and the valve seat 80 are set low on the upstream side of gas flowing in the flow-path-forming pressure chamber 56 and high on the gas downstream side. Moreover, in the inlet shutoff valve 20 and the outlet shutoff valve 22, the fuel cell stack 12 side (right side of FIG. 2) of the flow path is positioned on the front side in the direction along which the drive shaft 60 is driven from the valve-opened state to the valve-closed state. Therefore, the force acting on the valve member 58 in a valve-closing direction can be increased when the valve member 58 is pressed against the valve seat 80. More specifically, when the fuel cell stack 12 consumes oxygen and hydrogen to generate electricity, the pressures of the inlet shutoff valve 20 and the outlet shutoff valve 22 become negative at the fuel cell stack 12 side thereof.

Additionally, the flow of gas in two pipes 90 connected to the outlet shutoff valve 22 (a case of the inlet shutoff valve 20 or the humidifier bypass valve 18 is similar to the case of the valve 22) at both sides thereof with respect to the gas flowing direction is parallel to the horizontal direction at least in the periphery of the portion connected to the outlet shutoff valve 22. Therefore, the size L1 in the vertical direction of the portion including the outlet shutoff valve 22 and the pipe 90 connected to the outlet shutoff valve 22 can be further decreased.

Moreover, two pipes 90 connected to the gas upstream side and the gas downstream side of the outlet shutoff valve 22 (a case of the inlet shutoff valve 20 or the humidifier bypass valve 18 is similar to the case of the valve 22) have lower surfaces positioned on a single virtual plane α extending in the horizontal direction. Therefore, the size L1 in the vertical direction of the portion including the outlet shutoff valve 22 and the pipe 90 connected to the outlet shutoff valve 22 can be further decreased. Furthermore, in the above-described valves 22, 20, and 18, if two pipes connected to the gas upstream side and the downstream side have central axes positioned on the single virtual plane extending in the horizontal direction, a reduction can be realized in the size in the vertical direction of the portion including each valve 22, 20, or 18 and the pipe connected to the valve.

The fluid control valve included in a fuel cell system according to the present invention is not limited to the above-described outlet shutoff valve 22. For example, the fluid control valve according to the present invention is applicable to an open/close valve for a fuel cell, which is provided in a fuel related gas discharge flow path through which the hydrogen gas (fuel related gas) is discharged from the fuel cell stack 12.

INDUSTRIAL APPLICABILITY

The present invention is usable for a fuel cell system including a fuel cell stack, for example, which is installed on an automotive vehicle being a fuel cell vehicle, and can serve as a power source of the vehicle traction motor.

What is claimed is:

1. A fuel cell system comprising:
a fuel cell capable of generating electricity through an electrochemical reaction between an oxidizing gas and a fuel gas;
an inlet shutoff valve that is provided in an oxidizing gas supply flow path for supplying oxidizing gas to the fuel cell and that closes or opens a gas flow path according to a displacement in an axial direction of a valve member having a drive shaft; and
an outlet shutoff valve that is provided in an oxidizing related gas discharge flow path in which oxidizing related gas discharged from the fuel cell flows and that closes or opens the gas flow path according to the displacement in the axial direction of the valve member having the drive shaft, wherein
the inlet shutoff valve comprises a valve member, a valve seat, an inlet side connecting portion adjacent to a gas upstream side of the valve seat, and an outlet side connecting portion adjacent to a gas downstream side of the valve seat,
in the inlet shutoff valve, the valve member and the valve seat have pressing surfaces, which press against each other and are tilted relative to a gravity-acting direction, and the pressing surfaces of the valve member and the valve seat are set low on an upstream side of gas flowing in the gas flow path and high on a gas downstream side,
the inlet side connecting portion is tilted from the valve seat toward the gas upstream side in a slope equal to the pressing surfaces of the valve member and the valve seat, and has an input side end facing a horizontal direction,
the outlet side connecting portion has an outlet side extending in the horizontal direction and a valve seat side tilted in an upward direction toward the valve seat,
the outlet shutoff valve comprises a valve member, a valve seat, an inlet side connecting portion adjacent to a gas upstream side of the valve seat, and an outlet side connecting portion adjacent to a gas downstream side of the valve seat,
in the outlet shutoff valve, the valve member and the valve seat have pressing surfaces, which press against each other and are tilted relative to the gravity-acting direction, and the pressing surfaces of the valve member and the valve seat are set high on the upstream side of the gas flowing in the gas flow path and low on the gas downstream side,
the inlet side connecting portion has an inlet side extending in the horizontal direction and a valve seat side tilted in an upward direction toward the valve seat,
the outlet side connecting portion is tilted from the valve seat toward the gas downstream side in a slope equal to the pressing surfaces of the valve member and the valve seat, and has an outlet side end facing the horizontal direction, and
in the inlet shutoff valve and the outlet shutoff valve, a fuel cell side is positioned on the flow path at a front side in the direction along which the drive shaft is driven from a valve-opened state to a valve-closed state.

2. The fuel cell system according to claim 1, wherein the outlet shutoff valve is provided in an oxidizing related gas discharge flow path through which oxidizing related gas is discharged from the fuel cell.

3. The fuel cell system according to claim 1, wherein the flow of gas in two pipes connected to the inlet shutoff valve and the outlet shutoff valve at both sides thereof with respect to the gas flowing direction is in the horizontal direction at least in the periphery of a portion connected to each of the valves.

4. The fuel cell system according to claim 1, wherein an upstream side pipe and a downstream side pipe connected to the inlet shutoff valve and the outlet shutoff valve have central axes or lower surfaces positioned on a single virtual plane extending in the horizontal direction.

* * * * *